(12) United States Patent
Mehta et al.

(10) Patent No.: US 6,296,887 B1
(45) Date of Patent: Oct. 2, 2001

(54) PROCESS FOR PRODUCING TEA CONCENTRATES

(75) Inventors: Sheetal Sharadkumar Mehta; Vijay Sukumar, both of Mumbai; Prakash Dattatraya Virkar, Bagalore, all of (IN)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/537,842

(22) Filed: Mar. 29, 2000

(30) Foreign Application Priority Data

Mar. 31, 1999 (IN) .......................................... 240/99
May 28, 1999 (EP) .................................................. 99304179

(51) Int. Cl.⁷ ................ A23F 3/34; A23F 3/36; A23F 3/08; A23F 3/00
(52) U.S. Cl. .......................... 426/435; 426/597; 426/263; 426/312
(58) Field of Search .................................... 426/597, 435, 426/263, 312

(56) References Cited

U.S. PATENT DOCUMENTS

| | | |
|---|---|---|
| 2,975,057 | 3/1961 | Seltzer et al. . |
| 3,787,590 | 1/1974 | Borders et al. . |
| 3,950,553 | 4/1976 | Gasser et al. . |
| 5,139,802 * | 8/1992 | Liu et al. . |
| 5,683,736 | 11/1997 | Lunder . |
| 5,827,560 | 10/1998 | Fu et al. . |

FOREIGN PATENT DOCUMENTS

| | | |
|---|---|---|
| 0 699 393 A1 | 9/1994 | (EP) . |
| 1 311 255 | 3/1973 | (GB) . |
| WO 97/46112 | 12/1997 | (WO) . |

* cited by examiner

Primary Examiner—Anthony J. Weier
(74) Attorney, Agent, or Firm—James J. Farrell

(57) ABSTRACT

A process for preparing tea concentrates particularly those suitable for making cold soluble instant tea products. The process involves preparing an extract of tea leaves that contains insoluble tea solids and at least 5% soluble tea solids. The extract is treated with air or oxygen at a temperature between room temperature and 100° C. for 1 to 120 minutes; while cell wall material from a vegetable source is mixed with it prior to or after said treatment with said air or oxygen. The solubilised extract is filtered and concentrated to yield the tea concentrate.

7 Claims, No Drawings

PROCESS FOR PRODUCING TEA CONCENTRATES

This invention relates to a process for the preparing cold water soluble tea concentrates that are suitable for making cold soluble instant tea.

BACKGROUND OF THE INVENTION

There is an increasing demand for ready to drink tea or iced tea and several methods for extracting the tea solids in concentrated form, and such that they are cold water soluble have been investigated.

Several attempts have been made to improve the cold water solubility of instant tea but they have not been fully successful. Cold water soluble instant tea was generally prepared by cooling a hot water extract of leaf tea, and separating the precipitated insoluble portions by filtration or centrifugation. The insoluble material, which is often referred to as the tea cream, is discarded and the clear extract is dried. This process entails a considerable loss in yield.

United States patent specification U.S. Pat. No. 5,827,560 (Nestec S. A.) discloses a continuous process for producing a cold water soluble tea extract. Tea solids are extracted from tea leaves using an extraction liquid to provide a tea extract that contains soluble tea solids and insoluble tannins. The insoluble tannins are separated from the tea extract by cooling the extract to below about 15° C., usually to about 5° C. to 10° C. (i.e. chill decreaming). The insoluble tannins are then oxidised and solubilised under raised temperature and pressure conditions to provide a solubilised tannin liquor. Ground green tea can be added to the tannin liquor prior to oxidation to assist the oxidation reaction. The solubilised tannin liquor is either returned to the extraction liquid during liquid extraction of tea solids or added to the tea extract after separation of the insoluble tannins. A tea extract that contains solubilised tea tannins is collected.

United States patent specification U.S. Pat. No. 3,163,539 (Standard Brands Incorporated, 1964) discloses an improved process for preparing cold soluble tea having acceptable flavour, aroma and colour. The process described involves preparing a water extract of tea leaf and treating the cold water insoluble constituents of the extract with sodium hydroxide, preferably in the presence of oxygen. This treatment may be done either after or without separation of these constituents from the cold water soluble part of the extract. Through this treatment the previously insoluble constituents are rendered cold water soluble. The resulting alkaline liquor is neutralised and the total tea liquor is concentrated by evaporation to produce instant tea. According to this disclosure oxygen plays an important role, along with alkali, in the solubilisation reaction and introducing air or pure oxygen can increase solubilisation.

Though by the process described in U.S. Pat. No. 3,163,539, alkali induced solubilisation is enhanced by introducing air into the extract, this may lead to excessive darkening of the extract. Solubilisation should therefore be achieved rapidly so as to prevent undue darkening of the colour of the extract. Moreover introduction of air or oxygen into the strongly alkaline mixture leads to increased foaming of the extract during solubilisation with alkali.

European patent specification EP 699393 A (Nestlé) discloses a process for recovering tea cream effectively by mixing the insoluble cream separated by chilling with spent black tea leaves or with green tea leaves and concentrating and drying the pooled hot water soluble and cold solubilised extracts. According to this process in order to improve the solubilisation, it is essential to separate the cream by chilling and then treat the same with spent tea leaves or green tea leaves.

It has now been found that it is possible to improve solubilisation of the tea solids without the use of alkali, acids etc. and without the process of cold decreaming. This process may be made more cost effective as it can avoid the process of chilling which involves the use of a refrigeration system. The extract thus produced has good clarity and has high levels of soluble tea solids.

STATEMENT OF THE INVENTION

The present invention relates to a process for preparing a tea concentrate that is suitable for making a cold soluble instant tea comprising the steps of:

(a) preparing an extract of tea leaves that contains insoluble tea solids and at least 5% soluble tea solids;

(b) treating said extract with air or oxygen at a temperature between room temperature and 100° C. for 1 to 120 minutes; while cell wall material from a vegetable source is mixed therein prior to or after said treatment with said air or oxygen; and (c) filtering and concentrating the solubilised extract to yield the tea concentrate.

The extract is preferably treated with the air or oxygen at a temperature between 70 and 90° C.

The cell wall material is preferably selected from the group of agricultural products consisting of rice husk, sugarcane fiber, bagasse, saw dust, small wood chips, spent tea, and green tea and mixtures thereof.

Further advantages of this invention will be more apparent from the ensuing description. "Tea" for the purposes of the present invention means leaf material from *Camellia sinensis* var. *sinensis* or *Camellia sinensis* var. *assamica*. It also includes rooibos tea obtained from *Aspalathus linearis* however that is a poor source of endogenous fermenting enzymes. "Tea" is also intended to include the product of blending two or more of any of these teas.

For the avoidance of doubt the word "comprising" is intended to mean including but not necessarily "consisting of" or "composed of". In other words the listed steps or options need not be exhaustive.

Except in the operating and comparative examples, or where otherwise explicitly indicated, all numbers in this description indicating amounts or concentrations of material ought to be understood as modified by the word "about".

DETAILED DESCRIPTION OF THE INVENTION

The extract can be prepared by extracting tea leaves with water, preferably hot water (60–100° C.). The tea leaf material used may be selected from any of the known tea varieties of black, oolong and green tea, or blends thereof. But the use of black tea is preferred.

The extract will contain soluble tea solids, generally more than 5%, and insoluble tea solids. It can be concentrated if desired using any suitable art known means or process.

One could separate the soluble tea solids in the extract from the insoluble tea solids in the extract by chilling the extract and removing the tea cream that precipitates out but in doing so one would lose a significant amount of tea solids and thus reduce the obtainable yield. Furthermore, chilling requires the use of refrigeration equipment, which can be expensive, particularly when the ambient temperature is high.

The extract is treated with air or oxygen to oxidise it. This typically involves aerating the extract for 1 to 120 minutes, but an aeration time of 20 to 60 minutes is particularly preferred. The choice of aeration time influences the colour of the tea concentrate and beverages made from same. In essence a longer aeration provides darker colours. One can therefore adjust the aeration time in order to obtain the desired colour profile.

The extract should be aerated at or above ambient temperature, and preferably below 100° C. Aerating the extract at a temperature between 70 and 90° C. is particularly preferred. The choice of temperature can also influence the colour of the tea concentrate and beverages made therefrom.

The extract is preferably aerated and at normal atmospheric pressure. But, good results can obtained when aerating the extract at higher pressures of up to about 10 kg/cm$^2$.

Cell wall material from a vegetable source is mixed with the extract prior to or preferably after the aeration step in order to induce cold water insolubility in the tea solids. The cell wall material may be selected from a range of agricultural products such as rice husk, sugarcane fiber or bagasse, saw dust, small wood chips, spent tea, green tea or mixtures thereof. These materials are preferably used at a level of 5–30% weight based on total tea solids in the extract for a period of 5 to 30 minutes.

If desired, the total mixture is neutralised thereafter by adjusting the pH to about 6.0 to improve the taste. This neutralisation is preferably achieved using alkali or alkaline earth metal salts of citric acid. The alkali or alkaline earth metal salt is preferably sodium, potassium or a calcium salt of citric acid.

The water soluble extract is filtered and concentrated using any suitable art known means to yield the tea concentrate of the invention. The concentrate can be dried, for example spray dried, to give an instant tea.

The invention will now be described with reference to the following examples. The ensuing examples are intended to illustrate particular embodiments of the invention, and not imply any limitation on the scope of this invention.

EXAMPLE

Example 1

Conventional Process (Chemical process)

1000 g of black tea leaf was extracted with 10,000 ml of water at a temperature of 90° C. for 10 minutes. The leaf fines were separated out by filtration and extract was concentrated to about 15% total solids by evaporation. The extract was chilled to 5° C. and centrifuged. The supernatant was separated from the pellet(the cream fraction). The cream fraction obtained was subjected to alkali treatment by adding 60 ml of aqueous 20% solution of sodium hydroxide and the temperature was increased to 90° C. with simultaneous aeration for 10 minutes to obtain a light colour and for 60 minutes to obtain a dark colour final product. The solubilised cream was blended with the supernatant, neutralised by adjusting the pH to about 5 to 5.3. The extract was clarified by removing the insolubles by chilling and centrifuging and finally concentrated and spray dried to obtain the final product.

Example 2

Process According to the Invention 1000 g of black tea leaf was extracted with 10,000 ml of water at a temperature of 90° C. for 10 minutes. The leaf fines were separated out by filtration and extract was concentrated to about 15% total solids. Differences in treatment (Samples 1–3) with regard to aeration and mixing with agricultural by products, for e.g. rice husk, were maintained for comparison.

Sample 1: No aeration and no treatment with rice husk
Sample 2: Aeration given but no treatment with rice husk
Sample 3: Aeration and treatment with rice husk.

Samples of the leaf extract was at 90° C. was sparged with air for 45 minutes and later mixed with 30 g of rice husk was added and mixed for 5–10 minutes. The reacted tea concentrate is centrifuged to remove the added husk, concentrated and spray dried.

The comparison of the colour development and clarity and other product details by the conventional process and that by the process of the present invention is presented in Table 1.

TABLE 1

Comparison of colour development and clarity of products produced by the known process and that of the present invention

| Samples | Colour[1] | Clarity[2] | Yield[3] % | Taste profile | Storage stability[4] |
|---|---|---|---|---|---|
| Chemical Process | 75–80 | <15 | 65 | Good | Good |
| Sample 1 (No aeration, no rice husk, cold polished to remove insolubles) | 89 | 40 | 60 | Thin, off | Poor |
| Sample 2 (Aeration, no rice husk, cold polished to remove insolubles) | 86 | 11 | 85 | Good tea taste | Fair |
| Sample 3 (Aeration, rice husk, only dehusked i.e. physical separation of husk fines) | 77 | 7 | 95 | Good tea taste | Good |
| Sample 4 (Aeration, no rice husk) | 70 | 50 | 95–97 | Off note; not clean | Very Poor |

[1]Colour of the product was measured by the "L" value measured in a Minolta colourimeter (1O mm pathlength cell) at ~1.0 g/lit concentration in buffered pH of 3.0 to 3.8.
Note: L values are comparable only when haze is less than 15 FTUs; otherwise a high haze value contributes to large scale light scattering which is wrongly attributed to light absorption by the colourimeter. An L value of 70 with 50 FTU haze is equivalent to an L value of ~82 with 15 FTU haze (visually similar in lightness/darkness).
[2]Clarity was measured as Formazin Turbidity Units (FTUs), using Dr. Lange Turbiditymeter with 50 mm pathlength for the cell.
[3]$\text{Yield \%} = \frac{\text{Total solids recovered from process}}{\text{Total tea solids extracted}} \times 100$
[4]Storage stability of a ready to drink beverage was determined with respect to haze (i.e. clarity)

The data presented in Table 1 shows that the process according to the invention provides a concentrate that has acid stable colour with good clarity. The yields obtained are significantly superior to those obtainable by the conventional process.

What is claimed is:

1. A process for preparing a cold water soluble black tea concentrate comprising the steps of:
   (a) preparing an extract of black tea leaves that contains insoluble tea solids and at least 5% soluble tea solids;
   (b) treating said extract with air or oxygen at a temperature between room temperature and 100° C. for 1 to 120 minutes to give a solubilised extract; while cell wall material from a vegetable source is mixed therein prior to or after said treatment with said air or oxygen; and (c) filtering and concentrating the solubilised extract to yield the cold water soluble black tea concentrate.

2. A process according to claim 1 wherein the tea leaves are extracted in water having a temperature of between 60 and 100° C.

3. A process according to claim 1 wherein the extract is treated with the air or oxygen at a temperature between 70 and 90° C.

4. A process according to claim 1 wherein the cell wall material is mixed with the extract after the extract has been oxidised by the treatment with the air or oxygen.

5. A process according to claim 1 wherein the cell wall material is selected from the group of agricultural products consisting of rice husk, sugarcane fiber, bagasse, saw dust, small wood chips, spent tea, and green tea and mixtures thereof.

6. A process according to claim 1 wherein the pH of the soluble extract is adjusted to 6.0.

7. A process according to claim 1 further comprising spray drying the tea concentrate to give a cold water soluble instant tea product.

* * * * *